United States Patent [19]
Rivin

[11] Patent Number: 5,595,391
[45] Date of Patent: Jan. 21, 1997

[54] RELATING TO TAPERED CONNECTIONS

[75] Inventor: Evgeny I. Rivin, Southfield, Mich.

[73] Assignee: The Board of Governors of Wayne State University, Detroit, Mich.

[21] Appl. No.: 423,975

[22] Filed: Apr. 18, 1995

[51] Int. Cl.$^6$ .................................................. B23B 31/117
[52] U.S. Cl. ........................................ 279/103; 409/234
[58] Field of Search ............................ 279/9.1, 102, 103, 279/158; 408/238, 239 R, 239 A, 240; 409/232–234

[56] References Cited

U.S. PATENT DOCUMENTS

| | | |
|---|---|---|
| 3,806,272 | 4/1974 | Muller . |
| 4,621,960 | 11/1986 | Tollner . |
| 4,714,389 | 12/1987 | Johne . |
| 4,726,721 | 2/1988 | Heel et al. . |
| 4,840,520 | 6/1989 | Pfalzgraf . |
| 4,958,968 | 9/1990 | von Haas et al. . |
| 5,201,621 | 4/1993 | McMurtry et al. . |
| 5,322,304 | 6/1994 | Rivin . |
| 5,352,073 | 10/1994 | Kitaguchi . |

FOREIGN PATENT DOCUMENTS

| | | |
|---|---|---|
| 63-245358 | 4/1988 | Japan . |
| 390877 | 1/1974 | U.S.S.R. ................... 279/103 |
| 403514 | 3/1974 | U.S.S.R. ................... 409/232 |

OTHER PUBLICATIONS

"New Toolholder/Spindle Interface"; Agapiou, Rivin, Xie; (To be published in CIRP Annals, 1995.).

"Trends in Tooling for CNC Machine Tools: Tool Spindle Interfaces"; Eugene I. Rivin; Manufacturing Review, vol. 4, No. 4, Dec., 1991.

*Primary Examiner*—Steven C. Bishop
*Attorney, Agent, or Firm*—Gifford, Krass, Groh, Sprinkle, Patmore, Anderson & Citkowski, P.C.

[57] ABSTRACT

An improved connection between a conical shank and conical receptacle is provided. A plurality of uniform resilient elements are mounted in a circumferential band arrangement adjacent the surface of the end of one of the shank or receptacle opposite to the end at which the shank is inserted into the receptacle. The uniform elements protrude from the surface by a dimension at least equal to the maximum clearance between the shank and receptacle. Therefore, when the shank is inserted into the receptacle, the resilient elements will contact the opposing surface to provide for accurate positioning of the shank. When the shank is fully inserted into the receptacle, reliable contact will be maintained along the entire length of the shank.

18 Claims, 4 Drawing Sheets

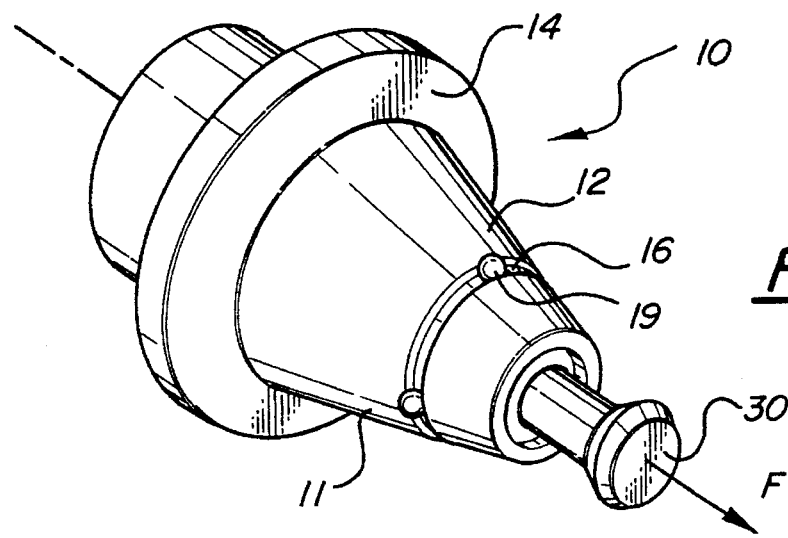
FIG-1
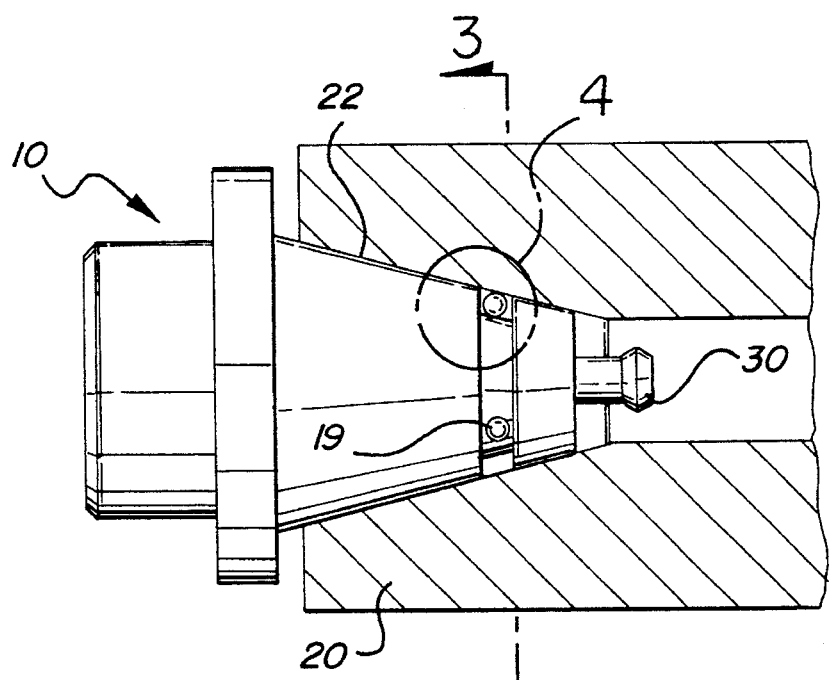
FIG-2
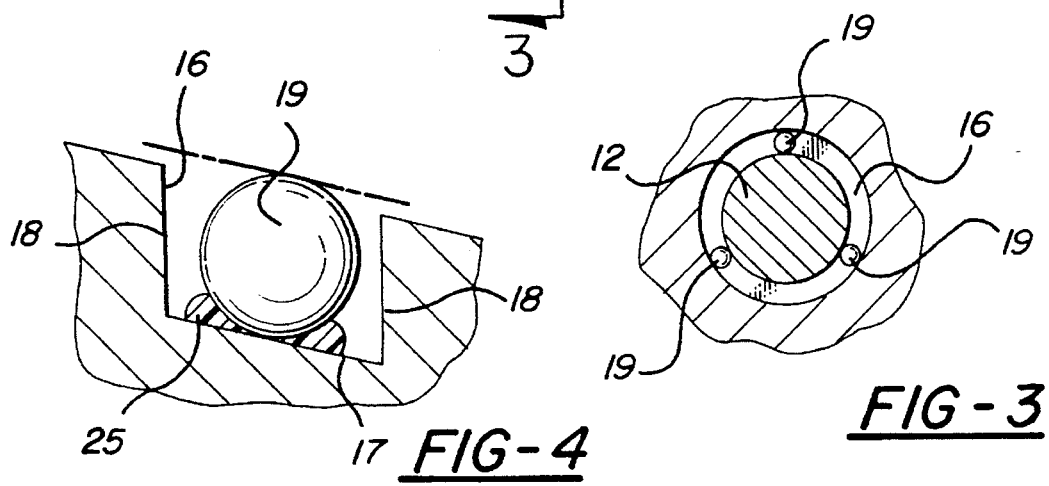
FIG-4
FIG-3

RELATING TO TAPERED CONNECTIONS

This invention was made with Government support, under Contract No. DDM 90 05654, awarded by the National Science Foundation. The Government has certain rights in the invention.

BACKGROUND OF THE INVENTION

I. Field of the Invention

The present invention concerns improvements relating to the connection between a conical shank and conical receptacle in general, and more specifically to an improved arrangement for connecting tool holders and spindles in machine tools.

II. Background of the Invention

Conical connections are widely used for precise collocation of parts in mechanical designs. A conical shank commonly has a counterpart in and is fitted to a conical receptacle and vice versa. For example, a conical shank of a drill matches the inside taper of a mating sleeve.

The connections serve a dual role: to align the axes of both the conical shank and conical receptacle and to provide stiffness to the connection. Since it is impossible to make conical surfaces with perfect accuracy, there are established standard classes of deviations for both the conical shank and receptacle (AT0, AT4, etc. with the tolerance becoming more loose with the increasing class number). In one arrangement, in all tolerance classes, the angle of the conical receptacle can be only smaller than the nominal angle, and the angle of the conical shank can be only larger than the nominal. Such tolerance allocation ensures that the conical surfaces of the shank and receptacle are in contact at the frontal (wider) portion of the connection thus providing a higher stiffness. However, it does not guarantee that the conical surfaces are in contact at their rear (narrower) end. Since standard tolerance allocations typically specify a negative deviation of the conical receptacle and a positive deviation of the conical shank, a clearance typically results at the rear end of the connection. For example, a typical AT4 quality has 13 angular second tolerance on each angle, which may result in radial clearance as high as 0.013 mm. at the rear end of the connection. This leads to mobility of the conical shank under heavy cutting forces and to significant runout if the drawbar force is not perfectly symmetrical. In another arrangement, the tolerance classes can be reversed with the angle of the conical receptacle being only larger than a nominal angle, and the angle of the shank being only smaller than nominal. Consequently, this tolerance allocation would ensure that conical surfaces of the shank and receptacle are in contact at the rear (narrower) portion of the connection. However, it would not guarantee that the conical surfaces are in contact at their front (wider) end.

A common application of conical connections is for connecting tool holders and spindles in machine tools. The term "tool holder" embraces, within the scope of the invention, all components which are used for performing machining or measuring operations and for this purpose are detachably fixed in a rotating or stationary spindle or in a stationary block. A tool holder typically includes a tapered shank that is adapted to be inserted into a tapered receiving bore of the spindle/block.

The shank-spindle interface is very important for both stiffness and accuracy in machining. Radial clearance at either end of the tapered connection due to taper tolerancing necessarily reduces stiffness and increases runout, and can cause fretting corrosion and fast wear of the spindle tapered receiving bore and will reduce machining accuracy.

Past attempts have been made to provide a high precision taper connection between the shank of the tool holder and the spindle that has both high radial and axial stiffness to prevent runout of the tool holder and increase machining accuracy. Yet, many of these arrangements require a complete redesign of existing tool holders and spindles and may be prohibitively expensive.

My goal in this invention was to develop an improved connection between a conical shank and a conical receptacle that overcomes many of the shortcomings of the prior art. I have found that my connection exhibits higher stiffness and better accuracy than conventional interfaces and is compatible with existing tool holders and spindles. Although my invention finds particularly important use in the connections between tool holders and spindles, it has many other applications.

SUMMARY OF THE PRESENT INVENTION

To improve the connection between a conical shank and a conical receptacle, resilient means are mounted in a circumferential band arrangement adjacent the surface of one end of either the shank or receptacle. The resilient means protrude from the surface by a dimension at least equal to the maximum clearance between the shank and receptacle at the band. Therefore, when the shank is inserted into the receptacle, the resilient means will contact the opposing surface to provide for accurate positioning of the shank. When the shank is fully inserted into the receptacle, reliable contact will be maintained along the entire length of the shank.

In the preferred embodiment, the resilient means are spherical steel balls. At least three spherical balls are mounted in a coaxial groove machined in the shank and are deformable upon contact with the receptacle. The present invention contemplates the use of other resilient means, such as resilient cylindrical rings or an O-ring, as well as resilient members made of materials other than steel, such as titanium, plastic and glass. Moreover, the resilient elements may be mounted in a groove formed in the receptacle and still provide the same advantages.

BRIEF DESCRIPTION OF THE DRAWINGS

Additional objects, advantages, and features of the present invention will become apparent from the following description and appended claims, taken in conjunction with the accompanying drawings in which:

FIG. 1 shows a perspective view of the tool holder in the preferred embodiment of the present invention;

FIG. 2 shows an axial longitudinal cross sectional view of the tool holder of the preferred embodiment of the present invention in the front part of the spindle;

FIG. 3 shows a forward cross sectional view along lines 3—3 of FIG. 2;

FIG. 4 shows a side cross sectional view of the coaxial groove as noted in FIG. 2;

DETAILED DESCRIPTION OF A PREFERRED EMBODIMENT OF THE PRESENT INVENTION

Figure 5:
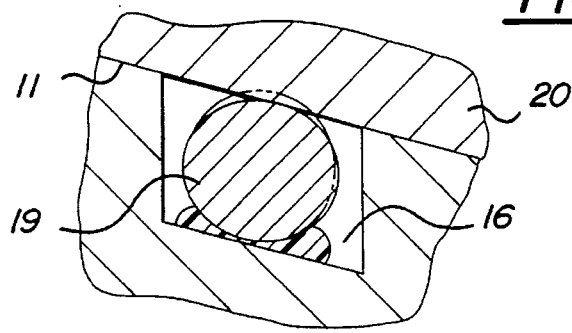
FIG. 5 shows a cross sectional view of the coaxial groove particularly showing the deformation of a spherical ball due to contact with the spindle of the tool holder.

It should be understood that the following description of the preferred embodiment is merely exemplary in nature and is in no way intended to limit the invention or its applications or uses.

For example, the following description of the improved conical (tapered) connection, although provided for the connection between a conical shank of a tool holder and a spindle, in the preferred embodiment, is intended to be typical of conical connections that may be utilized in other applications. Modifications and variations of the present invention will readily occur to those skilled in the art.

Referring now to the drawings, in which corresponding parts are identified with the same reference numeral, and more particularly to FIG. 1, a tool holder, modified according to the preferred embodiment of the present invention, is designated generally at 10. The tool holder 10 has a shank 12 with a tapered conical surface 11 and a flange 14 forming a forward protruding extension thereof.

With reference also now to FIG. 2, the tool holder 10 is shown inserted into a tapered receiving bore 22 of a spindle 20 of a machine tool. The nominal angle of inclination of the tapered conical surface 11 is the same as the nominal angle of inclination of the tapered receiving bore 22 of the spindle 20. A coaxial groove 16 is formed at the narrow end of the shank 12 and extends circumferentially around the shank 12. As better shown in FIG. 4, the groove 16 has a tapered bottom surface 17 that is preferably parallel to the tapered conical surface 11 of the shank 12, and two opposing side surfaces 18. As seen in FIG. 3, a plurality of precision deformable balls 19 are disposed in the groove 16, with a minimum of three balls 19 extending around the circumference of the conical shank 12 in the groove 16. The balls 19 are secured in the groove 16 by the use of epoxy 25, resin, or some other suitable adhesive material. The balls 19 are positioned such that they are not contacting the opposing side surfaces 18 of the groove, since such contact may distort their deformation. Other than this precaution, their positioning is not critical due to the taper of the bottom surface 17 of the groove 16 which is identical to the taper of the conical surface 11 of the shank 12. As an alternative to being secured in the groove 16 by the use of an adhesive material, the balls 19 can be restrained by a cage (not shown) or by filling groove 16 with an easily deformable material (e.g., silicon rubber) having a hardness less than that of the balls 19. This has the advantage of preventing contamination of groove 16 around balls 19 with dirt or cutting chips.

Referring now to FIGS. 2 and 4, the diameter of the balls 19 is such that before the shank 12 is inserted into the spindle 20, the balls 19 protrude out of the groove 16 and extend outward from the tapered surface 11 of the shank 12 an amount slightly exceeding the maximum possible clearance between the male taper (shank 12) and female taper (tapered receiving bore 22 of spindle 20). The amount of protrusion is dictated by the combination of accuracy classes of the shank 12 and tapered receiving bore 22 of the spindle 20. The maximum clearance between the surface 11 of the shank 12 and bore 22 of the spindle 20 for milling taper 7/24 with a widely used combination of accuracy classes AT4/AT4 is 0.0004 in (0.01 mm). The amount of protrusion of the balls 19 should be larger than the amount of clearance and still assure allowable contact stresses in the contact between the tapered receiving bore 22 and the balls 19 and between the shank 12 and balls 19. Obviously, the maximum clearance occurs in the case when both male and female tapers are manufactured with the maximum allowable deviations from the nominal taper angle.

During the process of inserting the shank 12, into the tapered receiving bore 22 of the spindle 20, as best shown in FIG. 5, there occurs an interference between the balls 19 and the counterpart surface of the tapered receiving bore 22. The interference causes deformations of the balls 19 until the desired contact is secured at the frontal (wider) portion of the connection. At this moment there is reliable contact within the connection both in the frontal portion (rigid surface contact) and in the rear portion (via the resilient means). With sufficient stiffness of the resilient means, the connection performance under the cutting forces would be close to performance of the ideal connection in which both tapered surfaces have perfectly matching tapers. These allowable stresses which are chosen to prevent permanent dents on the tapered receiving bore 22 and shank 12 surfaces and/or damage to the balls 19, are readily available in design handbooks. Larger protrusion magnitudes result in higher stiffness of the connection.

Figure 6:
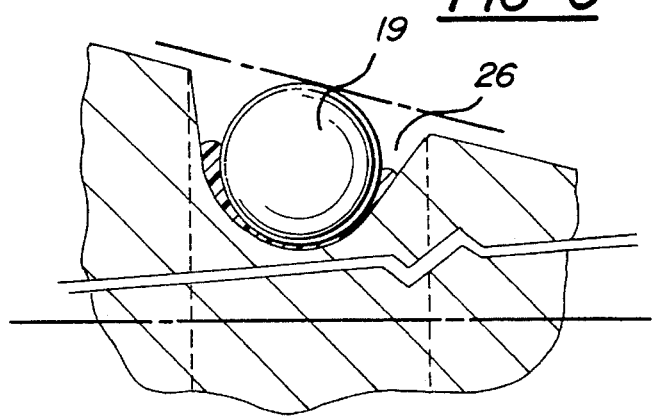
FIG. 6 shows a cross sectional view of the second embodiment of the present invention.

A second embodiment of the present invention is shown in FIG. 6. The coaxial groove 26 is semi-circular in cross section and extends around the circumference of the shank 12. The semi-circular shape prevents any axial shifting of the balls 19.

Spherical balls 19 are used as the resilient means in the preferred embodiment. Highly precise (in diameter and sphericity) balls 19 are available at reasonably low prices and their use allows for a very precise alignment of the shank 12 in the tapered receiving bore 22, and also assures very consistent values of stiffness in different directions. Stiffness of each ball 19 is determined by compression of the ball 19 itself and by contact (Hertzian) deformations between the ball 19 and the tapered shank 12 and between the ball 19 and tapered receiving bore 22. Although steel balls 19 are used in the preferred embodiment, balls 19 made of various materials such as glass, plastic, ceramic and titanium (and thus having a broad range of Young's moduli and stiffness) may also be used.

Figure 7:
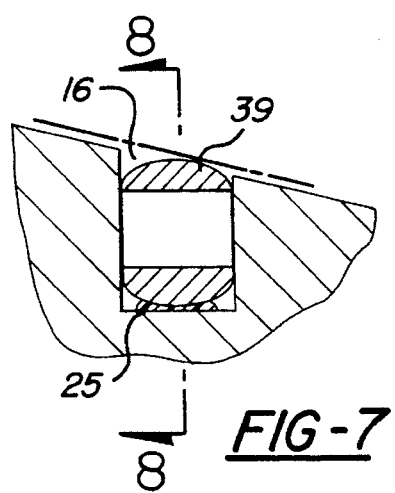
FIG. 7 shows a cross sectional view of the third embodiment of the present invention.
Figure 8:
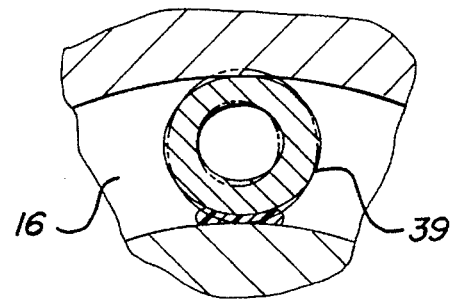
FIG. 8 shows a cross sectional view of a cylindrical ring in the groove along lines 8—8 of FIG. 7.
Figure 9:
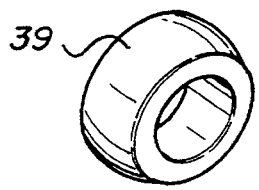
FIG. 9 shows a perspective view of the a cylindrical ring of FIG. 7.
Figure 10:
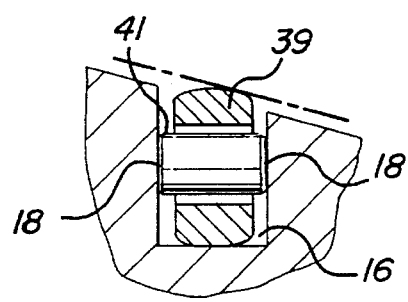
FIG. 10 shows the cylindrical ring of FIG. 7 in the coaxial groove.

Cylindrical rings 39 are used in the third embodiment of the present invention illustrated by FIGS. 7–10. As shown in FIG. 7, cylindrical rings 39 can be secured in the coaxial groove 16 through the use of epoxy 25 or some other adhesive material. As shown in FIG. 10, the epoxy may be replaced with a transverse member 41 that extends through the ring 39 and is secured to both of the side walls 18 of the groove 16. Upon contact with the spindle 20, the rings 39 are deformable as shown in FIG. 8.

Figure 11:
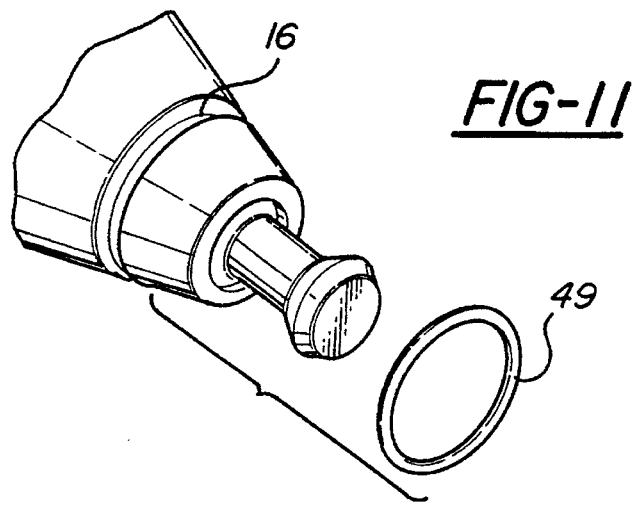
FIG. 11 shows a perspective view of a fourth embodiment of the present invention.
Figure 12:
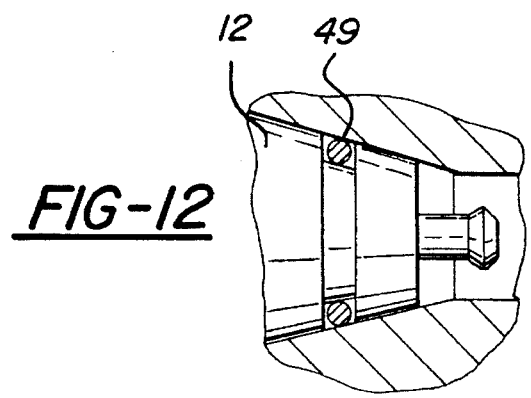
FIG. 12 shows an axial longitudinal cross sectional view of the tool holder of the fourth embodiment of the present invention in the front part of the spindle.

A fourth embodiment of the present invention is shown in FIGS. 11 and 12. An O-ring 49 is provided as the resilient member and is adapted to be secured in the coaxial groove 16. Upon insertion of the shank 12 into the tapered receiving bore 22, the O-ring 49 will deform and result in a tight connection.

Figure 13:
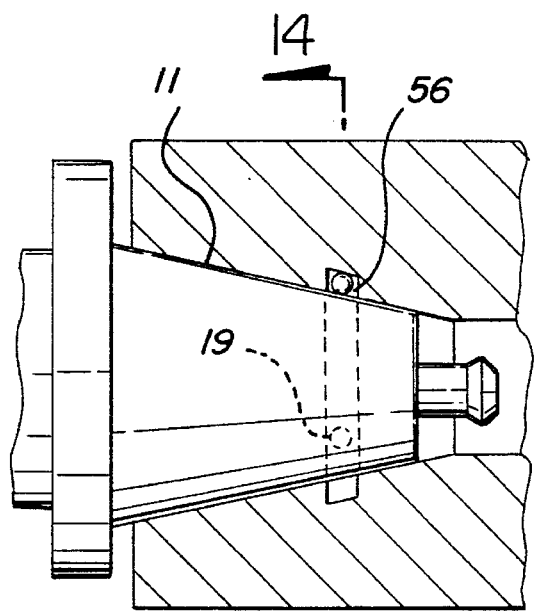
FIG. 13 shows an axial longitudinal cross sectional view of the tool holder of the fifth embodiment of the present invention in the front part of the spindle.
Figure 14:
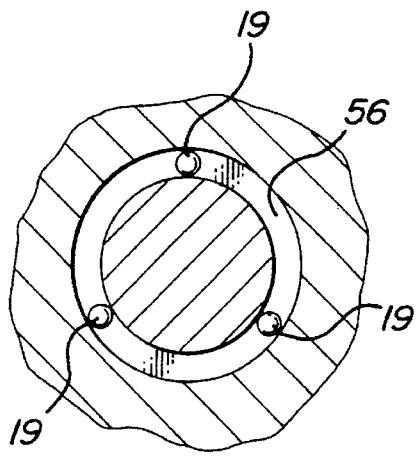
FIG. 14 shows a cross sectional view along lines 14—14 of FIG. 13.

A fifth embodiment of the present invention is shown in FIGS. 13–14. The resilient means are shown mounted in a circumferential arrangement adjacent the surface of the receptacle. Unlike the first four embodiments, a coaxial groove 56 is formed in the surface of the receptacle. The shank 12 in this embodiment has a continuous tapered surface 11. In FIG. 14, three spherical balls 19 are shown in the groove 56.

Figure 15:
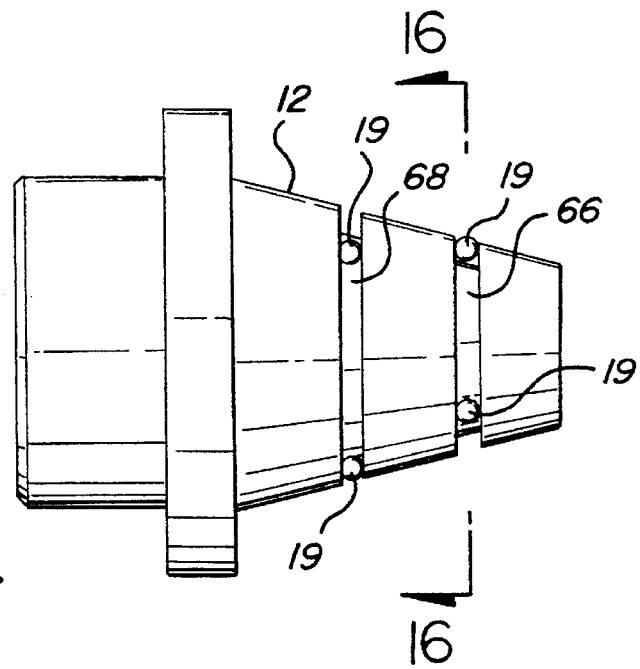
FIG. 15 shows an axial longitudinal cross sectional view of the tool holder of the sixth embodiment of the present invention in the front part of the spindle.
Figure 16:
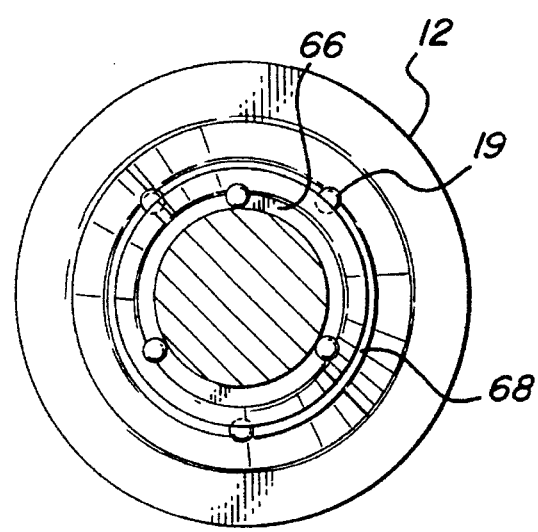
FIG. 16 shows a cross sectional view along lines 16—16 of FIG. 15.

A sixth embodiment of the present invention is shown in FIG. 15. Two coaxial grooves 66 and 68 are formed in the shank 12 and extend circumferentially around the shank 12. A plurality of spherical balls 19 are disposed in the grooves 66 and 68. As shown, the balls 19 are shown mounted randomly in the grooves 66 and 68. The balls 19 in groove 66 need not be in axial alignment with the balls 19 in groove 68 to provide the necessary stiffness in the connection between the shank 12 and spindle 20. FIG. 16 shows, in cross sectional view, three balls 19 in each of two grooves 66 and 68 extending around the circumference of the shank 12.

Figure 17:
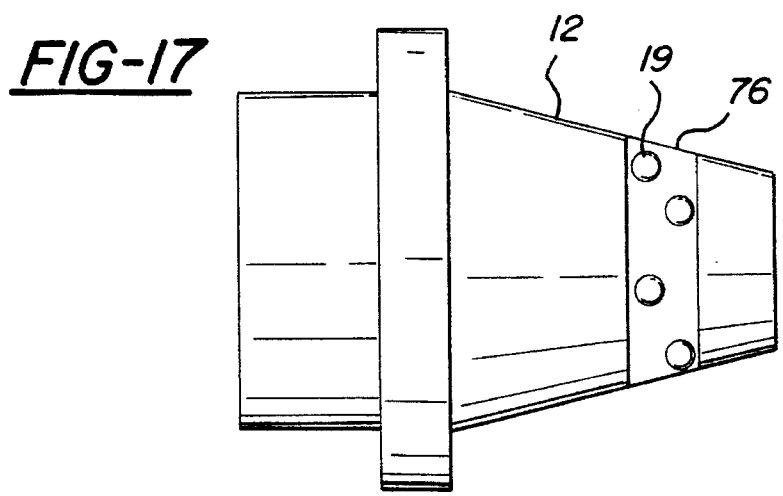
FIG. 17 shows an axial longitudinal cross sectional view of the tool holder of the seventh embodiment of the present invention in the front part of the spindle.

A seventh embodiment of the present invention is shown in FIG. 17. A wider coaxial groove 76 is shown formed in shank 12. The width of the groove is such that it can accommodate more than one row of resilient elements. As shown, two rows of balls 19 are disposed in the groove. The balls 19 need not be in axial alignment nor do they need to be in the same plane to provide the necessary stiffness between the shank 12 and spindle 20.

Referring back to FIGS. 1–3, the tool holder 10 of the present invention is introduced into the tapered receiving bore 22 of the main spindle 20 by exerting an axial force F applied to a retention knob 30 by a draw bar (not shown). As the tool holder 10 is drawn further into the tapered receiving bore 22, all of the balls 19 in the groove 16 of the shank 12 contact the opposing tapered surface of the spindle 20. With further inward movement of the tool holder 10, the balls 19 are resiliently deformed or flattened slightly to allow the flange 14 of the tool holder 10 to move into clamping engagement with the clamping surface of the spindle 20. Since the contact points of all of the balls 19 in a given row are at the same radial distance from the tool holder 10 central axis, initial asymmetrical positioning of the tool holder 10 would result in uneven deformation of the balls 19 and the ensuring unbalanced forces would restore the precise concentricity of the tool holder 10 and spindle 20.

Each of the embodiments disclosed provide an improved design for achieving simultaneous contact for both the conical interface and the clamping interface of the spindle 20 and tool holder 10, thereby ensuring that the tool holder 10 will be precisely located with respect to the central axis of the spindle 20 and further ensuring that the tool holder 10 and associated tool will be positively and stiffly held with respect to the spindle 20 and will remain stiffly held despite wear in the conical spindle 20 and despite widening of the mouth of the spindle 20 seat occurring under high speed operating conditions.

As shown in the various embodiments, resilient elements other than spherical balls 19 can be used without changing the principal concept of the invention. As mentioned earlier, cylindrical rings 39 or an O-ring 49 can be easily incorporated into the invention. Cylindrical rollers may also be used. Spherical balls 19 are used in the preferred embodiment due to the availability of highly precise balls at reasonably low cost. Furthermore, other cross sectional shapes of the ball-carrying groove 16 can be used without changing the principal concept of the invention.

Finally, although the six embodiments set forth above and in FIGS. 1–16 specifically show just one or two rows of balls, multiple rows of balls 19 can be incorporated into the present invention as well.

As will be apparent to one of ordinary skill in the art, a number of embodiments of the invention have been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

Having thus described my invention, I claim:

1. In a conical shank adapted to be inserted in a conical receptacle, the receptacle being formed with an angle approximating but deviating from the angle of said shank, whereby, when the shank is inserted into the receptacle, the mating surface of the shank and receptacle initially contact one another at one end of their engagement surface, the improvement comprising:

resilient extension means supported in a circumferential arrangement adjacent the surface of the end of one of the shank or receptacle opposite to the end at which the contact between the shank and receptacle initially occurs upon insertion of the shank into the receptacle, the extension means protruding from such support surface by a dimension at least equal to the maximum possible clearance between the shank and receptacle at said circumferential arrangement when such initial contact occurs, such extension means being sufficiently resilient so that, upon application of force to fully seat the shank into the receptacle, the extension means contact the opposing conical surface, whereby the extension means and contacting conical surfaces provide sufficient contact with the opposing surface to provide accurate radial positioning of the shank and high resistance to forces tending to disturb the radial position of the shank relative to the receptacle.

2. The invention of claim 1, wherein the resilient means is an O-ring.

3. The invention of claim 1, wherein the resilient means comprise a plurality of resilient elements.

4. The invention of claim 3, wherein the resilient elements are spherical balls.

5. The invention of claim 3, wherein the resilient elements are cylindrical rings.

6. The invention of claim 3, wherein the resilient elements are cylindrical rollers.

7. The invention of claim 4, wherein the shank further comprises at least one coaxial groove defined by two opposing side portions and a bottom surface extending between the two opposing side surfaces.

8. The invention of claim 7, wherein an adhesive material secures the balls in the groove.

9. The invention of claim 8, wherein the balls each have a diameter larger than the heights of the opposing side surfaces of the coaxial groove.

10. The invention of claim 9, wherein the balls undergo elastic deformation as the shank is inserted into the receptacle to provide consistent axial contact between the shank and receptacle.

11. In a conical shank adapted to be inserted in a conical receptacle, the receptacle being formed with an angle approximating but deviating from the angle of said shank, whereby, when the shank is inserted into the receptacle, the mating surface of the shank and receptacle initially contact one another at one end of their engagement surface, the improvement comprising:

a plurality of resilient extension elements in at least two axially spaced rows supported in a circumferential arrangement adjacent the surface of the end of one of the shank or receptacle opposite to the end at which the contact between the shank and receptacle initially occurs upon insertion of the shank into the receptacle, the extension means protruding from such support surface by a dimension at least equal to the maximum possible clearance between the shank and receptacle at said circumferential arrangement when such initial contact occurs, such extension means being sufficiently resilient so that, upon application of force to fully seat the shank into the receptacle, the extension elements contact the opposing conical surface, whereby the extension means and contacting conical surfaces provide sufficient contact with the opposing surface to provide accurate radial positioning of the shank and high resistance to forces tending to disturb the radial position of the shank relative to the receptacle.

12. The invention of claim 11, wherein the resilient elements are spherical balls.

13. The invention of claim 11, wherein the resilient elements are cylindrical rings.

14. The invention of claim 11, wherein the resilient elements are cylindrical rollers.

15. A tool holder, comprising:

a spindle, having a tapered receiving bore having a tapered conical surface having an angle smaller than a nominal angle;

a tapered shank releasably insertable into the tapered receiving bore, the tapered shank having a conical surface having an angle larger than a nominal angle;

at least one coaxial groove formed in the shank or bore, defined by two opposing side portions and a bottom tapered surface extending between the two opposing side surfaces;

resilient extension elements protruding from the groove for providing a tight connection between the shank and tapered receiving bore when the shank is inserted into the spindle;

wherein the amount of protrusion from the groove is at least equal to the maximum possible clearance defined by the angles of the tapered receiving bore and shank so that, upon application of force sufficient to fully seat the shank into the bore, the extension elements contact the opposing conical surface, whereby the extension elements and contacting conical surfaces provide sufficient contact with the opposing surface to provide accurate radial positioning of the shank and high resistance to forces tending to disturb the radial position of the shank.

16. The invention of claim 15, wherein the resilient elements are spherical balls.

17. The invention of claim 15, wherein the resilient elements are cylindrical rings.

18. The invention of claim 15, wherein the resilient elements are cylindrical rollers.

* * * * *